US007011370B2

(12) United States Patent
Jeong

(10) Patent No.: US 7,011,370 B2
(45) Date of Patent: Mar. 14, 2006

(54) VEHICLE SEAT RECLINER

(75) Inventor: Chan Ho Jeong, Gwangmyeong (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 10/946,023

(22) Filed: Sep. 21, 2004

(65) Prior Publication Data

US 2005/0067872 A1 Mar. 31, 2005

(30) Foreign Application Priority Data

Sep. 25, 2003 (KR) ................. 10-2003-0066516

(51) Int. Cl.
*B60N 2/10* (2006.01)
(52) U.S. Cl. .................. 297/367; 297/378.12
(58) Field of Classification Search ............. 297/367, 297/366, 378.12
See application file for complete search history.

(56) References Cited

U.S. PATENT DOCUMENTS

| 4,659,146 A | * | 4/1987 | Janiaud ............ 297/367 |
| 5,622,407 A | * | 4/1997 | Yamada et al. ........ 297/366 |
| 5,664,837 A | * | 9/1997 | Takagi ............... 297/367 |
| 5,685,611 A | * | 11/1997 | Eguchi et al. .......... 297/367 |
| 6,390,557 B1 | * | 5/2002 | Asano ............. 297/367 X |
| 6,454,354 B1 | * | 9/2002 | Vossmann et al. ..... 297/367 X |

FOREIGN PATENT DOCUMENTS

| JP | 10-057175 | 3/1998 |
| JP | 2000-342370 | 12/2000 |

* cited by examiner

*Primary Examiner*—Anthony D. Barfield
(74) *Attorney, Agent, or Firm*—Morgan Lewis & Bockius LLP

(57) ABSTRACT

A vehicle seat recliner in which a lock-up gear and a sector gear are used to adjust the tilt of the back of the seat. The sector gear adjusting the tilt of the back of the seat is fixed at a main bracket installed on one side of the car seat and comprises an adjustment lever rotating around a first rotation axis and connected to the connection lever rotating around a second rotation axis. A cam is interlocked with the adjustment lever and is installed on the first rotation axis. The motion of the lock-up gear is guided so that the lock-up gear and the sector gear are locked and released completely all at once.

6 Claims, 6 Drawing Sheets

VEHICLE SEAT RECLINER

CROSS-REFERENCE TO RELATED APPLICATIONS

This application claims priority of Korean Application No. 10-2003-0066516, filed Sep. 25, 2003, the disclosure of which is incorporated herein by reference.

BACKGROUND OF THE INVENTION (a) Field of the Invention

The present invention relates to a seat recliner for a vehicle, and more particularly to a seat recliner for a vehicle that provides enhanced durability through the engagement of the lock-up gear and sector gear.

(b) Description of the Related Art

A vehicle is equipped with seats on which a driver or passengers can sit comfortably. Typically, the seat includes a base operated by lever to permit forward and backward motion, and a reclineable seat back. At the rear of one side of the seat base there is provided the recliner mechanism by which the back of the seat is rotated forward and backward and the angle of the seat can be adjusted to suit the driver's or passenger's comfort level. In certain applications it may be necessary to secure the shoulder strap of a three-point safety restraint to the seat back.

The recliner mechanism typically includes a sector gear engaged by a lock-up gear. However, in certain modes of operation in conventional seats the tooth profile of the lock-up gear does not always completely engage the tooth profile of the sector gear, thus degrading the operation and safety of the seat. In particular, without complete engagement, a reclinable seat back may not have sufficient strength to adequately support the safety restraint.

SUMMARY OF THE INVENTION

Embodiments of the present invention provide a seat recliner for a vehicle with improved durability as the engagement and release of the tooth profiles can be achieved in whole when the lock-up gear is engaged with the sector gear connected to the seat back while moving up and down if the adjustment lever is adjusted to adjust the tilt of the car seat back.

A car seat recliner according to an embodiment of the present invention includes a sector gear adjusting the tilt of the back of the seat that is fixed at a main bracket installed on one side of the car seat. An adjustment lever rotates around a first rotation axis connected to a connection lever rotating around a second rotation axis by a rotation pin. A cam interlocked with the adjustment lever is installed on the first rotation axis. The cam has the lock-up gear placed inside a guide bracket and formed in the shape of the letter 'U' so that the engagement of the lock-up gear and sector gear can be set or released. The front and rear of the lock-up gear have guide pins formed in protruding shapes which are inserted into a guide groove formed on the main bracket in up and down directions and thus the up an down movement of the lock-up gear is guided.

It is preferable to have a return spring connected to one side of the connection lever.

It is also preferable to have the second rotation axis formed in the same way with the rotation axis of the back of the seat.

It is preferable for the lock-up gear to move in a linear mode in the radial direction to the second rotation axis It is preferable to have eight or more teeth formed on the lock-up gear.

It is preferable to have the teeth on the lock-up gear formed at an angle of 45 degrees or more to the second rotation axis.

In an alternative embodiment of the invention, a main bracket is secured to a seat bottom and a sector gear is secured to a seat back. A lock-up gear acts between the main bracket and sector gear. A camming mechanism cooperates with the lock-up gear to engage and disengage the lock-up gear from the sector gear. The engagement and disengagement is controlled such that at least substantially the entire opposed toothed faces of the two gears are engaged or disengaged at least substantially at the same time. It is preferred that the camming mechanism be oriented such that gravity moves the lock-up gear from the engaging position to disengaging position.

Preferably, the camming mechanism may comprise a rotatable cam, an adustment lever and a guide. The rotatable cam acts on the lock-up gear opposite the lock-up gear toothed face. The adjustment lever is interlocked with the cam to rotate the cam between engaging and disengaging positions. The guide cooperates with the lock-up gear to guide said gear along a substantially linear path to and from the sector gear. The lock-up gear may be formed with a concave face opposite its toothed face and the rotatable cam ths bears against the concave face. Also preferably, the rotatable cam has two projecting bearing surfaces with a space there between. The concave face of the lock-up gear is then correspondingly shaped such that a portion of the face lies between the projecting bearing surfaces in the disengaging position.

In a further preferred embodiments, the guide comprises a guide pin extending from at least one side of the lock-up gear, which is received in at least one corresponding slot in the main bracket. Also, a guide bracket may support the sides of the lock-up gear to further facilitate linear motion.

DETAILED DESCRIPTION OF THE PREFERRED EMBODIMENTS

Figure 1:
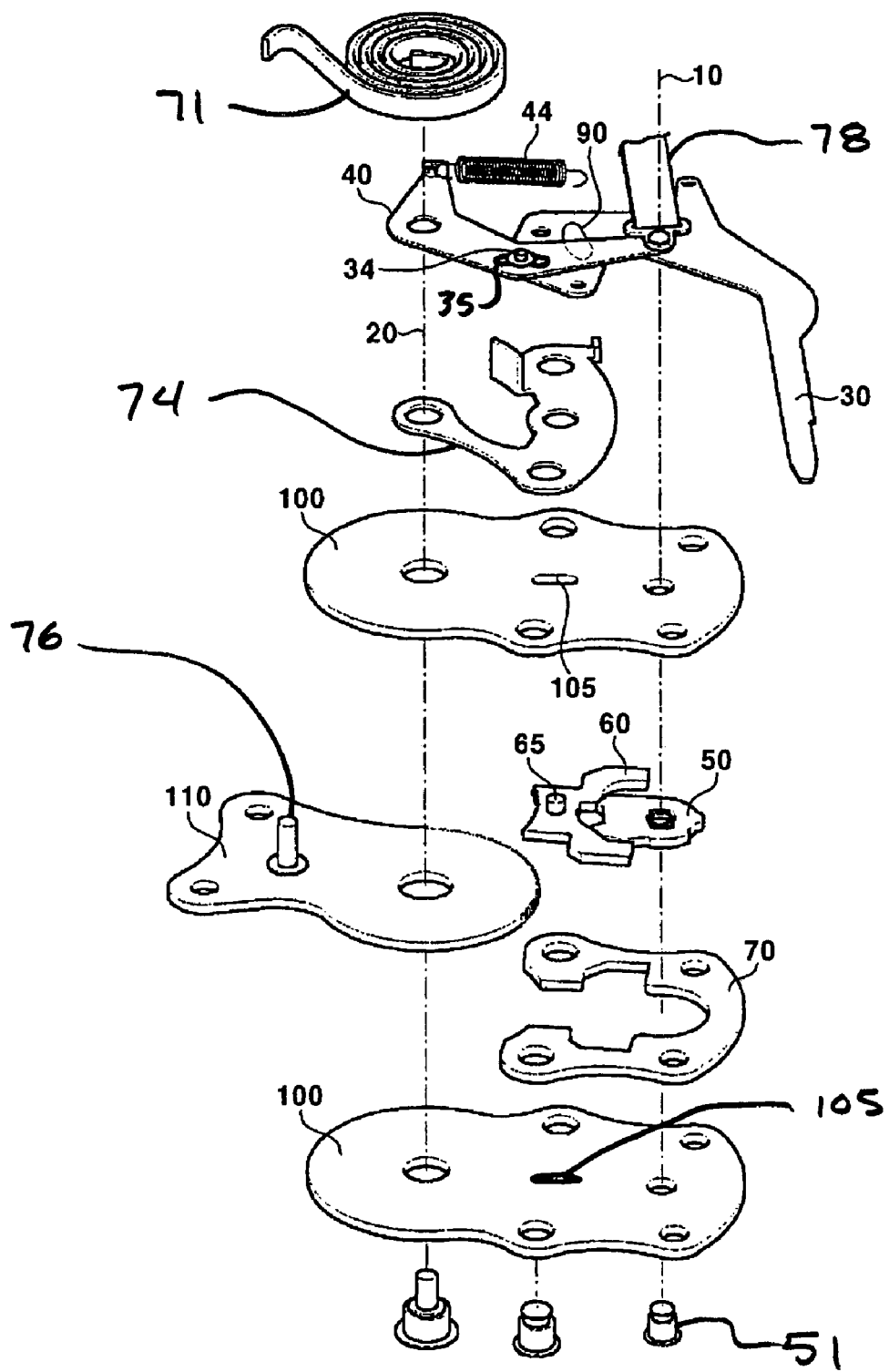
FIG. 1 is an exploded perspective of an embodiment of a car seat recliner mechanism according to the present invention.

As shown in FIG. 1, in a seat recliner according to one embodiment of the present invention, sector gear 110, which adjusts the tilt of the back of the seat, is fixed at a main bracket 100 installed on one side of the car seat. An adjustment lever 30 rotates around first rotation axis 10 and is connected to a connection lever 40 by a rotation pin 34. Rotation pin 34 is received in a slotted guide hole 35 formed in connection lever 40. Connection lever 40 rotates around second axis 20. Cam 50, interlocked with the adjustment lever 30 via a locking pin 51, also rotates around first rotation axis 10. Cam 50 acts on lock-up gear 60 that is disposed inside guide bracket 70 and formed in the shape of the letter 'U' so that the engagement of lock-up gear 60 and sector gear 110 can be set up or released by the rotation of cam 50.

Elongated guide groove 105 is formed in the main bracket 100 and oriented in an up and down direction. Guide pin 65, formed on the lock-up gear 60, is received in guide groove 105. Thus, up and down movement of the lock-up gear 60 is guided by the guide groove 105. Pin 65 may be formed on one or on both sides of gear 60. Guide groove(s) 105 are correspondingly formed in main bracket 100.

A slot 90 for moving lock-up gear 60 is formed on one side of the upper part of the adjustment lever 30. The guide pin 65 passes through guide groove 105 and is received in slot 90 for moving the lock-up gear. Slot 90 is formed with at least one arcuate wall, preferably with the first rotation axis 10 as the center of the arc. Therefore, when the adjustment lever 30 is rotated, up and down moving force acts on the guide pin 65 of the lock-up gear 60.

Return spring 44 is connected to one side of connection lever 40 and on the opposite side to return spring bracket 74. Also, it is preferable to have the second rotation axis 20 formed in the same way with the rotation axis of the back of the seat. Spiral spring 71 acts around axis 20 on sector gear 110 via pin 76 to facilitate positioning of the seat back.

Operation of one embodiment of the present invention can be explained referring to FIGS. 2 and 3 as follows:

The tilt of the car seat back needs to be adjusted to suit the driver or passenger's comfort. In this case, the passenger changes the tilt of the back of the seat by adjusting the adjustment lever.

Figure 2A:
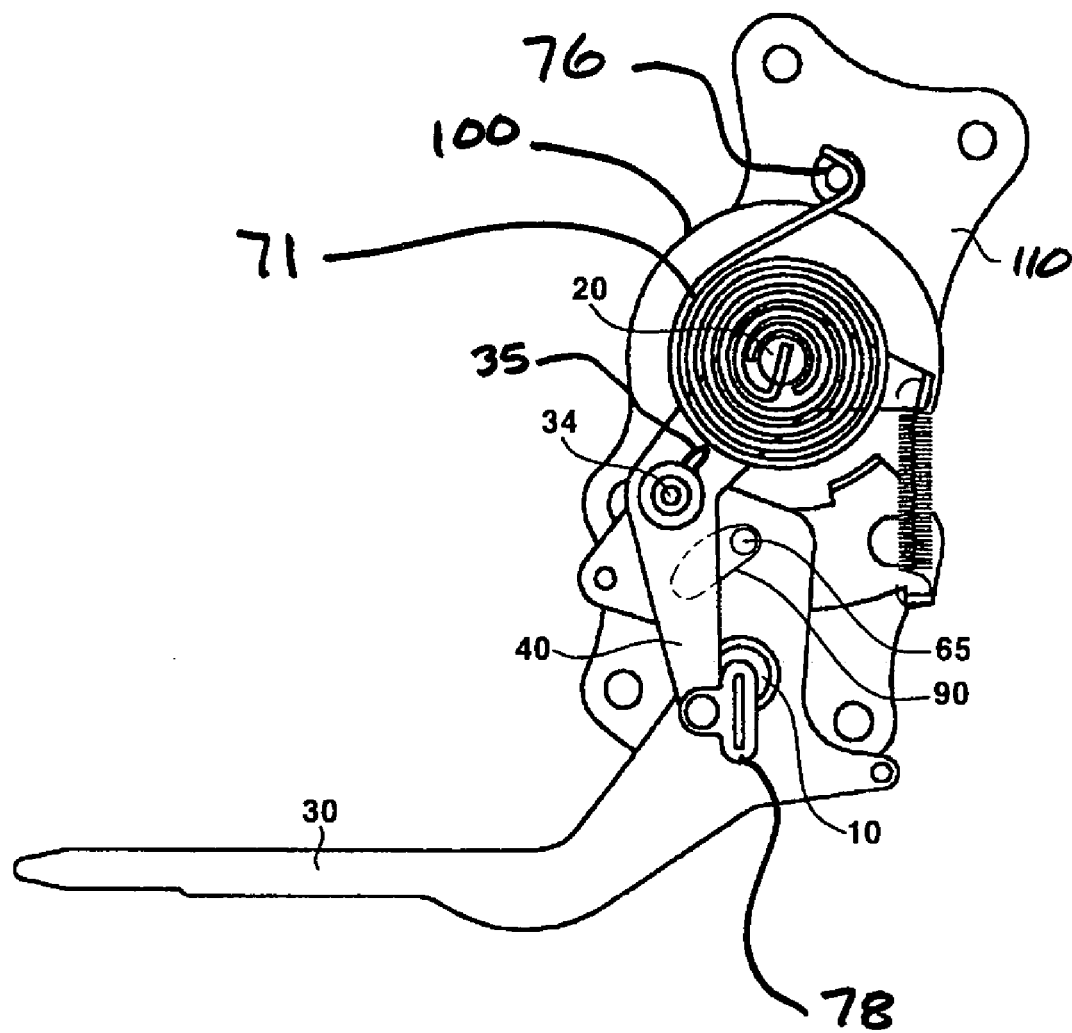
FIGS. 2a and 2b are side views showing different states of motion of the adjustment lever used in the present invention.
Figure 2B:
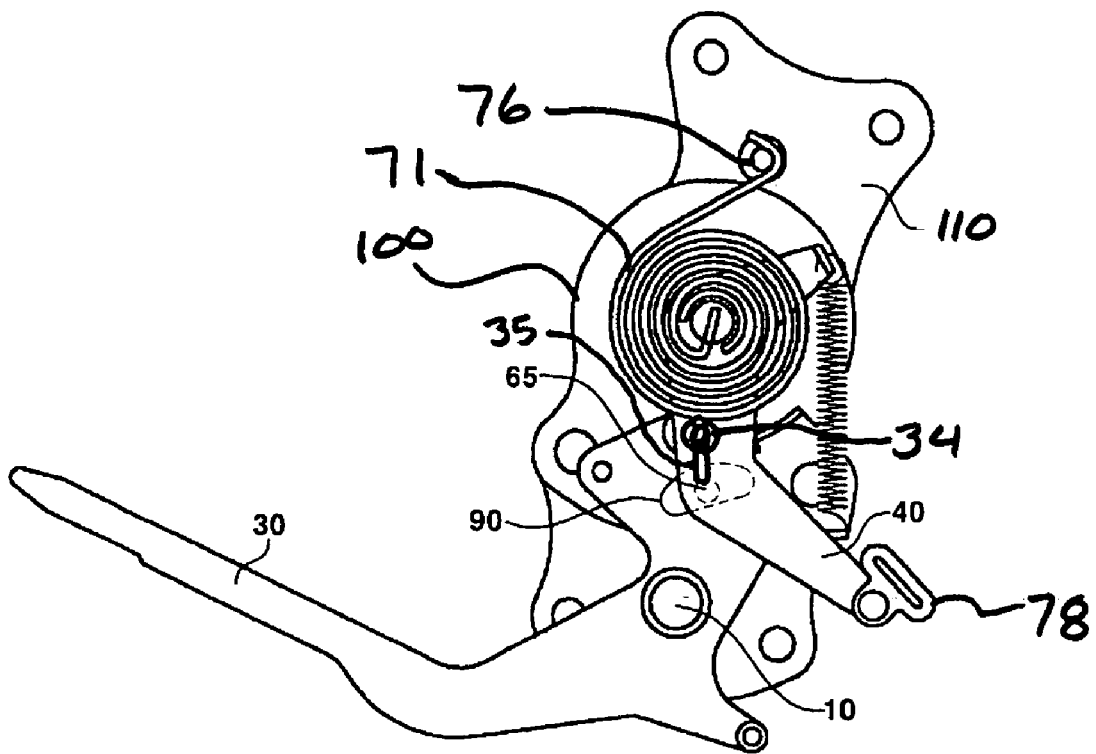

First, if the adjustment lever 30 is pulled up, the adjustment lever 30 rotates around the first rotation axis 10 and the rotation of the adjustment lever 30 is transferred to the connection lever 40 through the rotation pin 34 so that the connection lever 40 can rotate around the second rotation axis 20. The state of rotation of the adjustment lever 30 and the connection lever 40 in the two positions are illustrated in FIGS. 2a and 2b. Alternatively, the mechanism may be operated from behind the seat by pulling rear recliner strap 78.

Figure 3A:
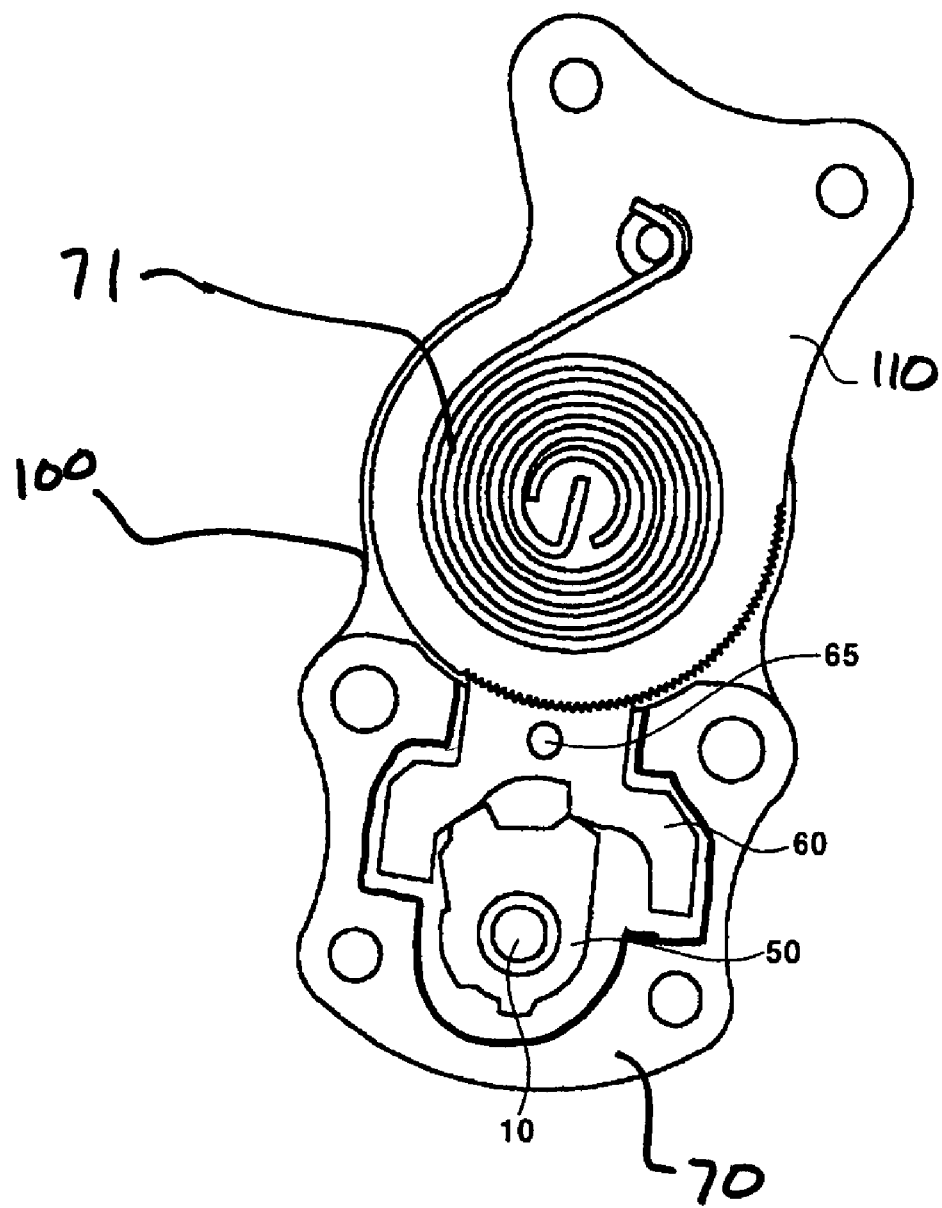
FIGS. 3a, 3b and 3c are side views showing different states of motion of the cam and lock-up gear following motion of the adjustment lever.

The upper part of cam 50 is in contact with the lower part of lock-up gear 60, as illustrated in FIG. 3a, before the adjustment lever 30 is manipulated. The engagement of the tooth profiles of the lock-up gear 60 and the sector gear 110 is thus maintained.

Figure 3B:
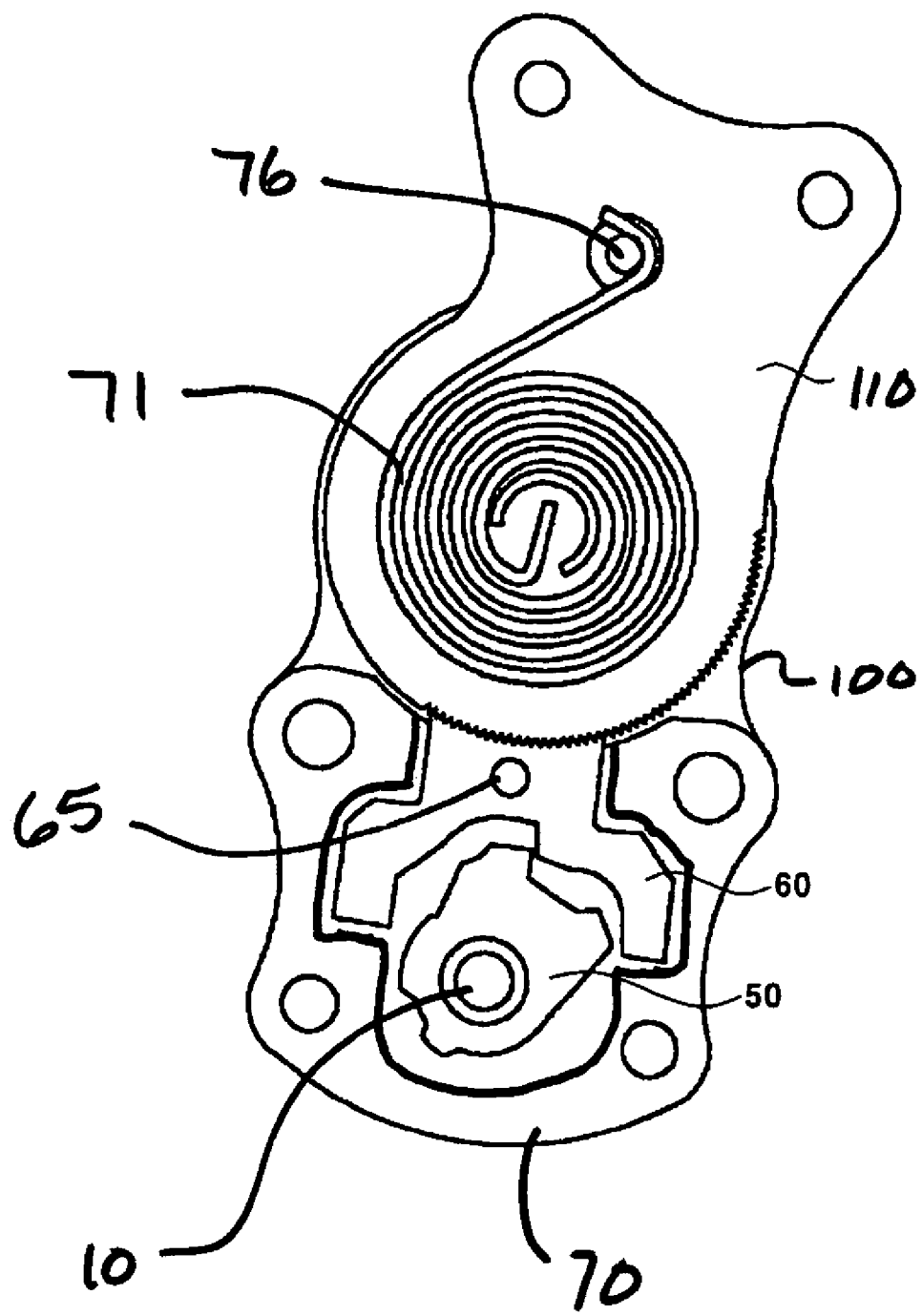

If the adjustment lever 30 is adjusted to the position as illustrated in FIG. 2b, cam 50 rotates around the first rotation axis 10 with adjustment lever 30 and is thus separated from the lower part of the lock-up gear 60 as illustrated in FIG. 3b. The lock-up gear 60 thus released from the lock-up state can move freely, but as the guide pin 65 is inserted into the guide groove 105 formed on the main bracket 100, the lock-up gear 60 moves only up and down.

Figure 3C:
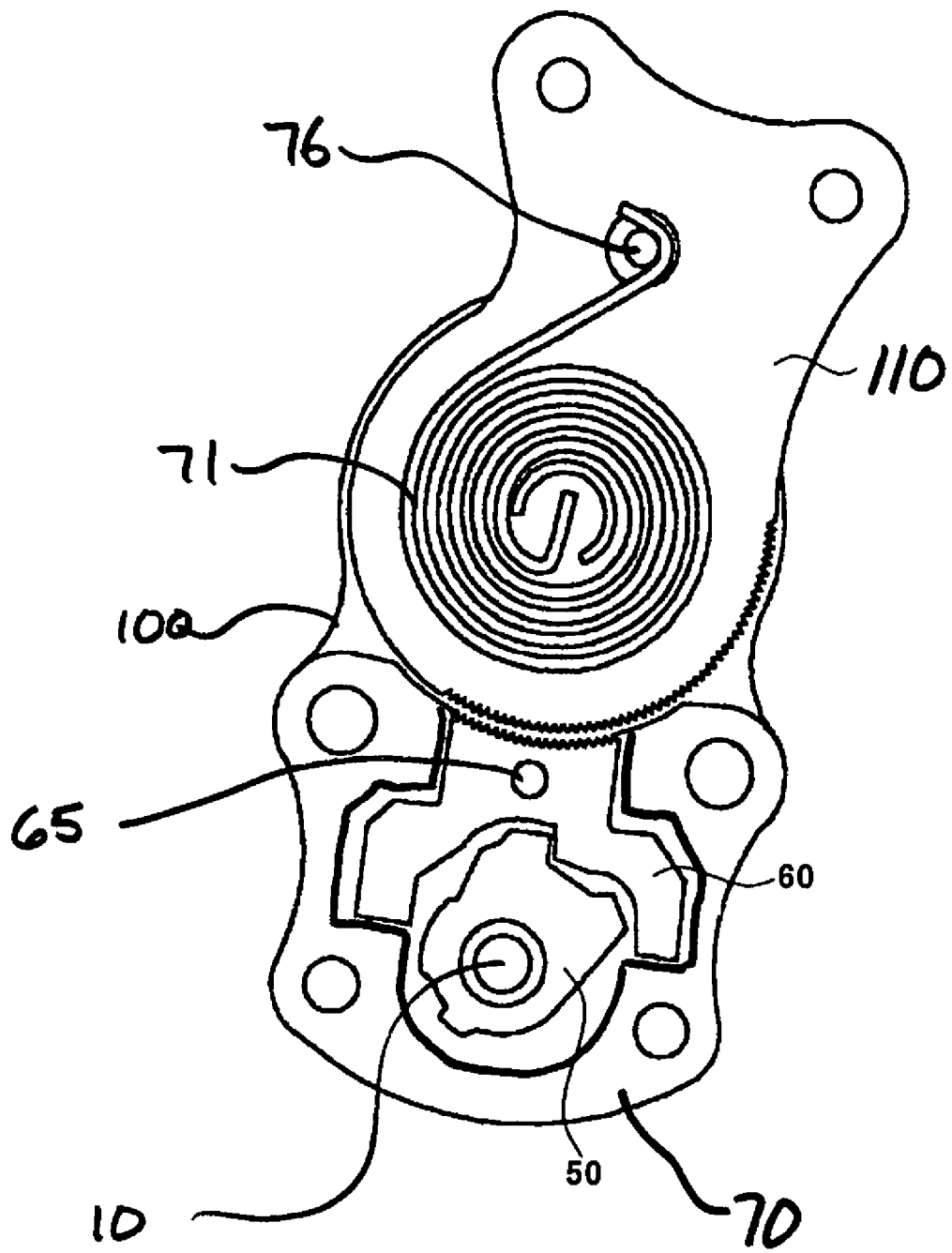

Once released, the lock-up gear 60 moves to the bottom and the entire tooth profile of the lock-up gear 60 is at once released from the engagement with the tooth profile of the sector gear 110. This state of the tooth profile of the lock-up gear 60 and the tooth profile of the sector gear 110 as disengaged from each other is illustrated in FIG. 3c. The passenger adjusts the tilt of the back of the seat when the lock-up gear 60 and the sector gear 110 are disengaged from each other.

After the adjustment of the tilt of the back is completed, if the force used to operate the adjustment lever 30 is released, the adjustment lever 30 is restored to its original position by the return spring 44 connected to one side of the connection lever 40. The cam 50 also is restored to its original position and comes in contact with the lower part of the lock-up gear 60 and thus the tooth profile of the lock-up gear 60 and the tooth profile of the sector gear 110 become engaged with each other. As the rotation axis of the seat is the same with the second rotation axis 20, the lock-up gear 60 and the sector gear 110 are always in engagement even if the tilt of the back of the seat is changed.

Even though the present invention has been illustrated and explained concerning a specific desirable implementation example as discussed above, the present invention is not limited to this implementation example but includes all of the various types of implementation examples which can be implemented by a person of ordinary skill in the art.

What is claimed is:

1. A seat recliner for a vehicle in which a sector gear for adjusting tilt of a seat back is fixed at a main bracket installed on one side of a seat, wherein an adjustment lever rotatable around a first rotation axis is connected by a rotation pin to a connection lever rotatable around a second rotation axis, a cam interlocked with the adjustment lever is installed on the first rotation axis, and the cam has a lock-up gear placed inside a guide bracket and formed in the shape of a letter 'U' so that engagement of the lock-up gear and the sector gear can be set up or released, and a guide pin formed on a least one side of the lock-up gear is inserted into an elongated guide groove formed on the main bracket to guide up and down motion of the lock-up gear.

2. The car seat recliner as in claim 1, wherein a return spring is connected to one side of the said connection lever.

3. The car seat recliner as in claim 1, wherein the said second rotation axis is formed in the same way with the rotation axis of the back of the seat.

4. The car seat recliner as in claim 1, wherein the said lock-up gear moves in a linear mode in the radial direction to the second rotation axis.

5. The car seat recliner as in claim 1, wherein eight or more teeth are formed on the said lock-up gear.

6. The car seat recliner as in claim 1, wherein the said teeth on the lock-up gear are formed in the angle of 45 degrees or more to the second rotation axis.

* * * * *

UNITED STATES PATENT AND TRADEMARK OFFICE
CERTIFICATE OF CORRECTION

| | | |
|---|---|---|
| PATENT NO. | : 7,011,370 B2 | Page 1 of 1 |
| APPLICATION NO. | : 10/946023 | |
| DATED | : March 14, 2006 | |
| INVENTOR(S) | : Chan Ho Jeong | |

It is certified that error appears in the above-identified patent and that said Letters Patent is hereby corrected as shown below:

On the front page:

Left column, line (73) "Hyundai Motor Company" should be chagned to --Kia Motors Corporation--.

Signed and Sealed this

Twelfth Day of June, 2007

JON W. DUDAS
*Director of the United States Patent and Trademark Office*